United States Patent
Fukawatase et al.

(10) Patent No.: US 9,114,777 B2
(45) Date of Patent: Aug. 25, 2015

(54) CURTAIN AIRBAG DEVICE AND OCCUPANT PROTECTING DEVICE

(71) Applicant: Toyota Jidosha Kabushiki Kaisha, Toyota-shi Aichi-ken (JP)

(72) Inventors: Osamu Fukawatase, Miyoshi (JP); Hiroyuki Taguchi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/100,840

(22) Filed: Dec. 9, 2013

(65) Prior Publication Data

US 2014/0239619 A1    Aug. 28, 2014

(30) Foreign Application Priority Data

Feb. 22, 2013   (JP) .................................. 2013-033765

(51) Int. Cl.
*B60R 21/20* (2011.01)
*B60R 21/2338* (2011.01)
*B60R 21/232* (2011.01)

(52) U.S. Cl.
CPC ........... *B60R 21/2338* (2013.01); *B60R 21/232* (2013.01); *B60R 2021/23386* (2013.01)

(58) Field of Classification Search
CPC .............. B60R 21/2338; B60R 21/232; B60R 2021/23386
USPC .................................... 280/730.2, 743.2, 729
See application file for complete search history.

(56) References Cited

U.S. PATENT DOCUMENTS

| | | | |
|---|---|---|---|
| 6,273,458 B1 * | 8/2001 | Steffens et al. ............ | 280/730.2 |
| 6,367,836 B1 * | 4/2002 | Tanase et al. .............. | 280/730.2 |
| 6,464,250 B1 * | 10/2002 | Faigle et al. ............... | 280/730.2 |
| 7,059,629 B2 * | 6/2006 | Takahara .................... | 280/730.2 |
| 7,063,351 B2 * | 6/2006 | Winkler ...................... | 280/730.2 |
| 7,278,659 B2 * | 10/2007 | Takahara .................... | 280/743.2 |
| 7,712,773 B2 * | 5/2010 | Walston ...................... | 280/730.2 |
| 8,282,125 B2 * | 10/2012 | Pinsenschaum et al. .. | 280/730.2 |
| 8,579,323 B2 * | 11/2013 | Kato et al. ................. | 280/730.2 |
| 8,636,301 B1 * | 1/2014 | Wang et al. ................ | 280/730.2 |
| 8,764,053 B1 * | 7/2014 | Dix ............................ | 280/730.2 |
| 2009/0102169 A1 | 4/2009 | Gloeckler et al. | |
| 2014/0203541 A1 * | 7/2014 | Wei et al. ................... | 280/730.2 |
| 2014/0217710 A1 * | 8/2014 | Fukawatase et al. ...... | 280/730.2 |

FOREIGN PATENT DOCUMENTS

| | | |
|---|---|---|
| JP | S50-14035 A | 2/1975 |
| JP | 2003-034209 A | 2/2003 |
| JP | 2006-088919 A | 4/2006 |
| JP | 2008-006895 A | 1/2008 |
| JP | 2009-531216 A | 9/2009 |
| JP | 2012-020719 A | 2/2012 |
| JP | 2012-096780 A | 5/2012 |

* cited by examiner

*Primary Examiner* — Joseph Rocca
*Assistant Examiner* — Joselynn Y Sliteris
(74) *Attorney, Agent, or Firm* — Gifford, Krass, Sprinkle, Anderson & Citkowski, P.C.

(57) ABSTRACT

A curtain airbag device comprising: a main deploying portion that, at a time when at least one of a small overlap impact or an oblique impact arises, receives a supply of gas and expands, and is deployed in a shape of a curtain along a side window glass; an auxiliary deploying portion that is provided at a front side with respect to the main deploying portion, and that, at a time of at least one of a small overlap impact or an oblique impact, receives a supply of gas and is expanded and deployed; and a tension structure that connects a front end side portion of a front pillar and a rear end side portion of the front pillar, and that is deployed while receiving tension such that an intermediate portion of the tension structure passes by a vehicle width direction outer side of the auxiliary deploying portion.

16 Claims, 4 Drawing Sheets

CURTAIN AIRBAG DEVICE AND OCCUPANT PROTECTING DEVICE

CROSS-REFERENCE TO RELATED APPLICATION

This application claims priority under 35 USC 119 from Japanese Patent Application No. 2013-033765, the disclosure of which is incorporated by reference herein.

BACKGROUND OF THE INVENTION

1. Field of the Invention

The present invention relates to a curtain airbag device and to an occupant protecting device that has the curtain airbag device.

2. Description of Related Art

In a curtain airbag, there is known a structure having a wide strap that is deployed in a substantially triangular shape as seen in side view (see, for example, Japanese Patent Application Laid-Open (JP-A) No. 2012-020719). In the deployed state, this wide strap connects the front pillar and a seam portion that is between a main chamber and a front chamber. In this structure, the front chamber is kept away from the side window by the wide strap that has been deployed.

SUMMARY OF THE INVENTION

In the above-described structure that keeps the front chamber away from the side window by the wide strap, it is difficult to ensure the amount of movement of the front chamber toward the vehicle inner side. Therefore, there is room for improvement in a structure that protects an occupant by a front chamber.

An object of the present invention is to provide a curtain airbag device and an occupant protecting device that can improve the occupant protecting ability by an auxiliary deploying portion that is expanded and deployed at the front of a main inflating portion.

A curtain airbag device relating to a first aspect includes: a main deploying portion that, at a time when a side impact arises, and at a time when at least one of a small overlap impact or an oblique impact arises, receives a supply of gas and expands, and is deployed in a shape of a curtain along a side window glass; an auxiliary deploying portion that is provided at a front side, in a vehicle front-rear direction, with respect to the main deploying portion, and that, at a time of at least one of a small overlap impact or an oblique impact, receives a supply of gas and is expanded and deployed; and a tension structure that connects a front end side portion in the vehicle front-rear direction of a front pillar and a rear end side portion in the vehicle front-rear direction of the front pillar, and that is deployed while receiving tension such that an intermediate portion in the vehicle front-rear direction passes by a vehicle width direction outer side of the auxiliary deploying portion.

DETAILED DESCRIPTION OF THE INVENTION

Figure 1:
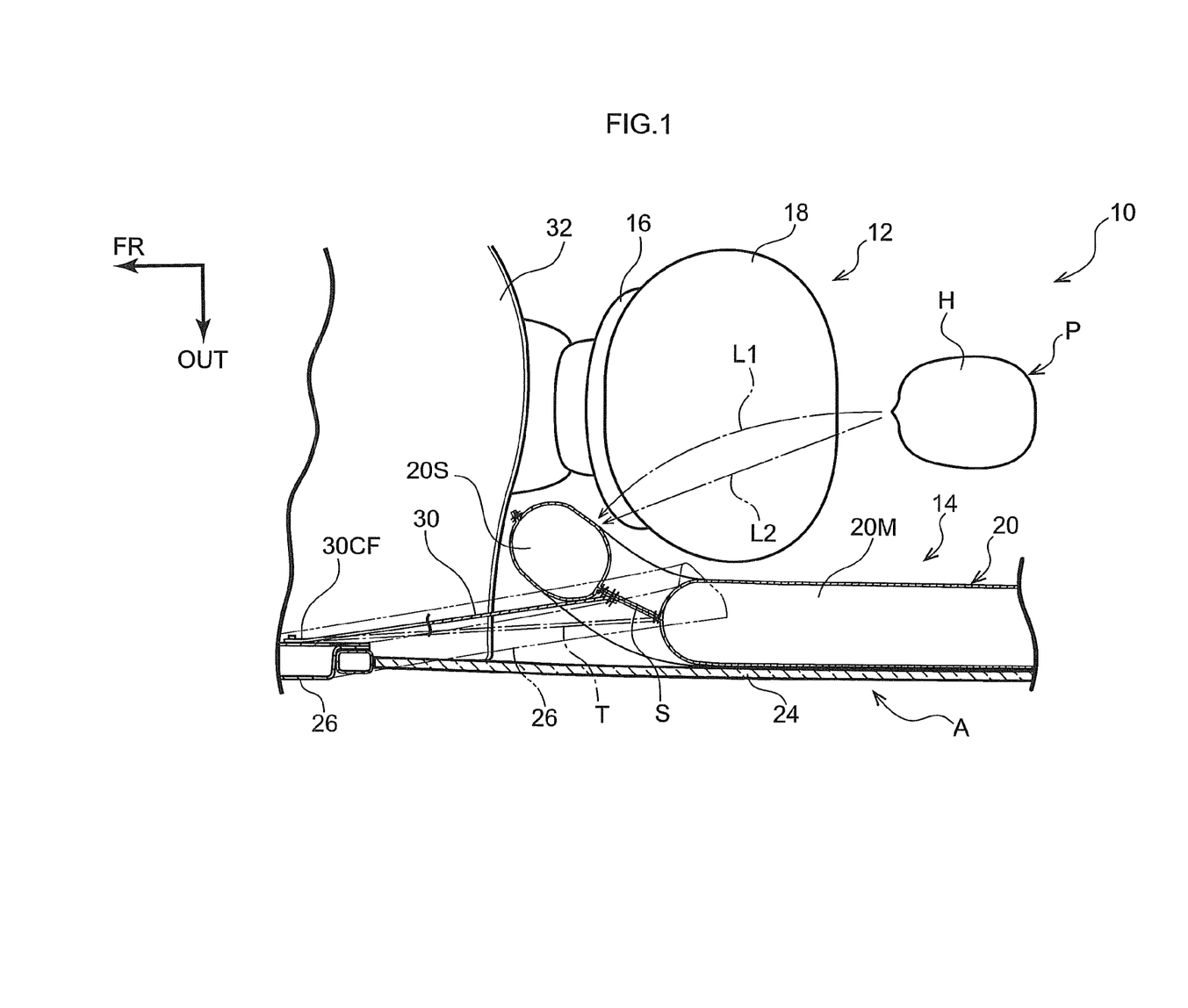
FIG. 1 is a plan view schematically showing an operated state of an occupant protecting device relating to a first embodiment of the present invention.
Figure 2:
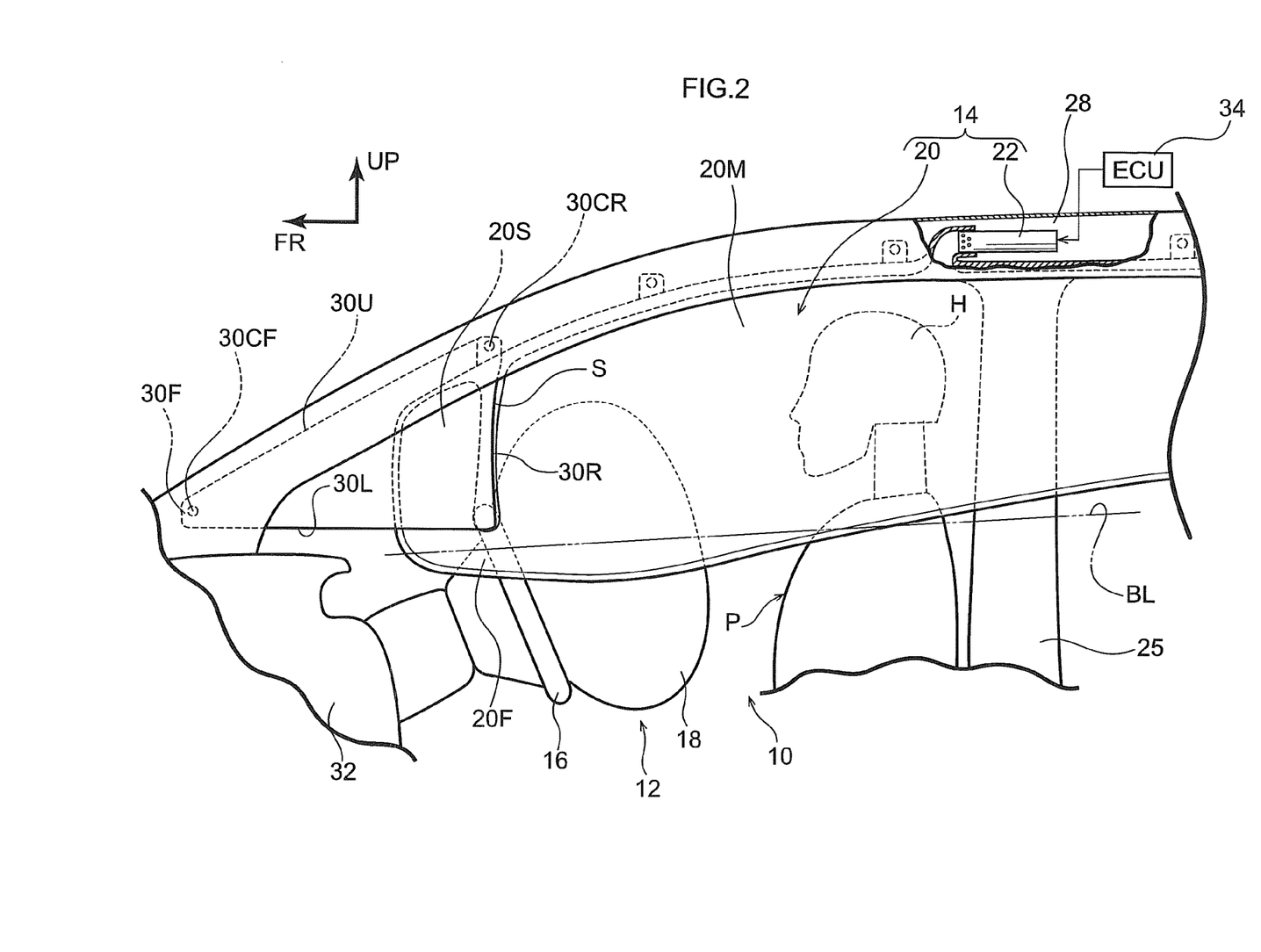
FIG. 2 is a side view seen from a vehicle outer side and schematically showing the operated state of the occupant protecting device relating to the first embodiment of the present invention.
Figure 3:
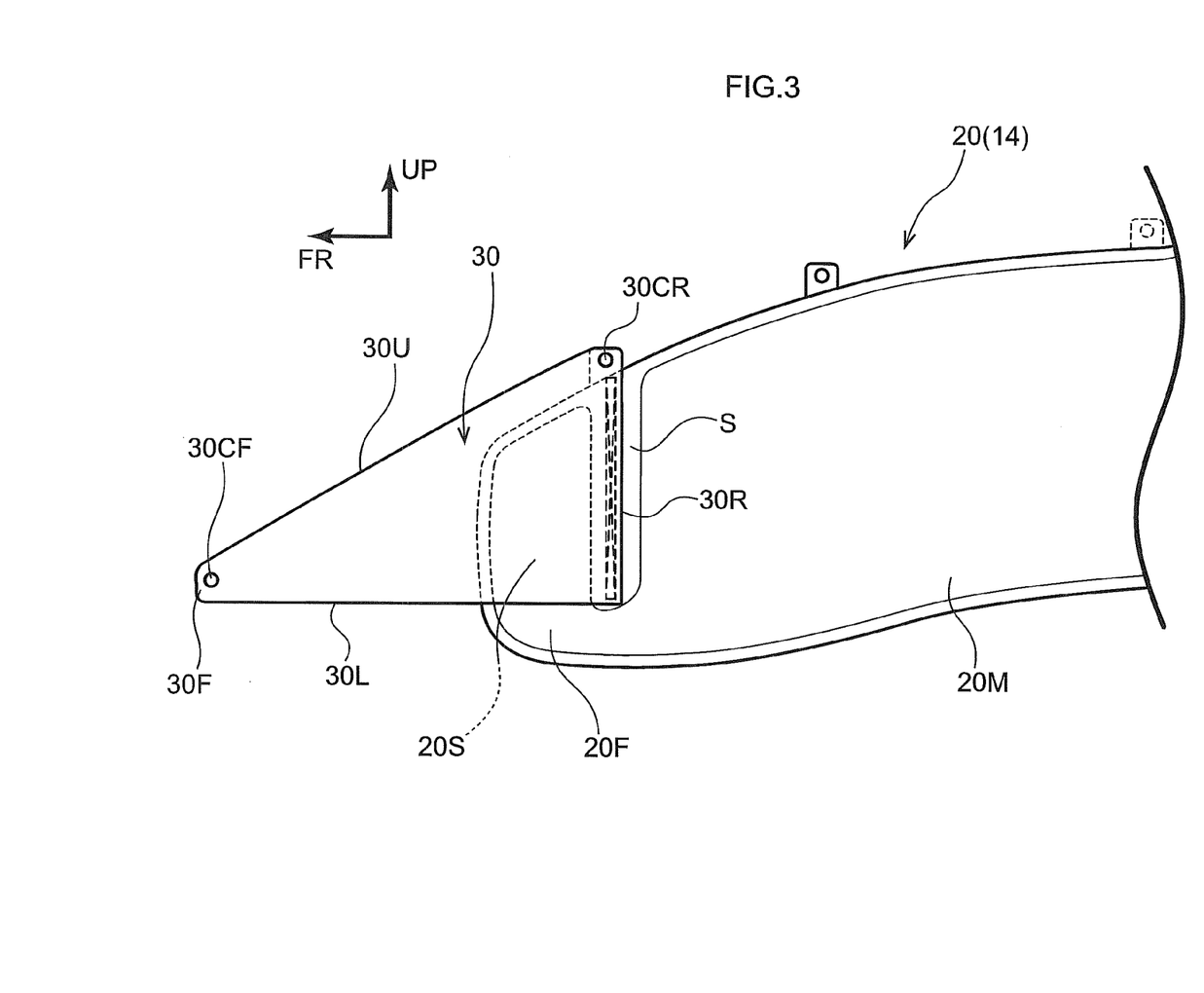
FIG. 3 is a side view showing the front portion of a curtain airbag that structures the occupant protecting device relating to the first embodiment of the present invention, and showing a state of not being expanded and deployed (before being folded-up).

An occupant protecting device 10 relating to an embodiment of the present invention is described on the basis of FIG. 1 through FIG. 3. Note that arrow FR, arrow UP and arrow OUT, that are shown appropriately in the respective drawings, indicate the frontward direction, the upward direction and the vehicle width direction outer side, respectively, of an automobile A to which the occupant protecting device 10 is applied. Hereinafter, when description is given by simply using the frontward and rearward, and upward and downward, directions, they indicate frontward and rearward in the vehicle front-rear direction, and upward and downward in the vehicle up-down direction, unless otherwise indicated.

A portion of a vehicle cabin interior of the automobile A to which the occupant protecting device 10 is applied is shown in a plan view in FIG. 1. A portion of the automobile A is shown in FIG. 2 in a side view seen from a vehicle outer side. As shown in these drawings, the occupant protecting device 10 is structured to include a driver's seat airbag device 12 serving as an airbag device for a front seat, and a curtain airbag device 14.

(Structure of Driver's Seat Airbag Device)

The driver's seat airbag device 12 has an airbag 18 for a frontal impact that is deployed at the rear of a steering wheel 16. The airbag 18 for a frontal impact is accommodated in a folded-up state within the steering wheel 16 together with an unillustrated inflator. Due to the inflator being operated, the airbag 18 for a frontal impact receives a supply of gas from the inflator, and is expanded and deployed between the steering wheel 16 and a driver's seat occupant P.

As described later, the inflator of this driver's seat airbag device 12 is operated at the time of a frontal impact of the automobile A, and at the time of a small overlap impact, and at the time of an oblique impact. Note that the states of impact of a small overlap impact and an oblique impact are described later.

(Structure of Curtain Airbag Device)

As shown in FIG. 2, the curtain airbag device 14 has a curtain airbag 20 and an inflator 22 that serves as a gas supplying device. The curtain airbag 20 is formed so as to deploy in the shape of a curtain along a side window glass 24 (see FIG. 1) that serves as a vehicle cabin inner side portion. In this embodiment, the curtain airbag 20 is structured so as to cover the front and rear side window glasses 24, that are positioned at the sides of the front seat and the rear seat, and a center pillar 25. Note that mainly the front portion of the curtain airbag 20 is illustrated in FIG. 1 and FIG. 2.

Although not illustrated, the curtain airbag 20 is accommodated in a portion that extends from a front pillar (an A pillar) 26 over a roof side portion 28 to a vicinity of a rear pillar, in a state of being, for example, folded into the form of a roll or folded into the form of bellows and made into an elongated shape. The roof side portion 28 in this embodiment forms the upper edges of front and rear door openings that serve as opening portions for ingress and egress. The door openings are formed so as to be surrounded by the roof side portion 28, the front pillar 26, the center pillar 25, and the rear pillar and a rocker that are both unillustrated. To further explain the front pillar 26, as shown by the imaginary lines in FIG. 1, the front pillar 26 extends obliquely in plan view such that the rear side thereof is positioned further toward the vehicle width direction inner side than the front side thereof. In other words, the front pillar 26 extends obliquely such that the upper side thereof is positioned further toward the vehicle width direction inner side than the lower side thereof.

More concretely, the curtain airbag 20 is accommodated between a roof head lining and a roof side rail that forms the roof side portion 28, and between the front pillar 26 and the pillar garnish. Note that a portion of the front end side of the curtain airbag 20 may be folded-up or folded-over toward the vehicle width direction inner side and accommodated in the roof side portion 28 or within the roof front end portion.

Further, due to the inflator 22 being operated, the curtain airbag 20 receives a supply of gas from the inflator 22, and deploys along the front and rear side window glasses 24 and the center pillar 25, and protects the heads of the occupants of the front seat and the rear seat. Concretely, a combustion type or a cold gas type inflator is employed for the inflator 22, and, by being operated, the inflator 22 supplies generated gas to the interior of the curtain airbag 20. The gas jet-out opening of the inflator 22 communicates with the inside of the curtain airbag 20. In this embodiment, the inflator 22 is disposed in the roof side portion 28. Note that the shape of the curtain airbag 20 is described later.

The above-described curtain airbag device 14 is provided at each of the roof side portions 28 and the like at the vehicle width direction both sides of the automobile A. Although illustration and detailed description are omitted, the curtain airbag device 14 for the front occupant's seat side is structured so as to have line symmetry (left-right symmetry) with the curtain airbag device 14 for the driver's seat side, across the vehicle width direction center (central line) of the automobile A. This curtain airbag 14 for the front occupant's seat side, and a front occupant's seat airbag device that serves as an airbag device for a front seat, structure an occupant protecting device.

(Structure of Curtain Airbag Front Portion)

The front portion at the curtain airbag 20 is structured to include a main deploying portion 20M that mainly protects a head H of a driver's seat occupant P with respect to side impacts and roll-overs, and an auxiliary deploying portion 20S that is expanded and deployed at the front of the main deploying portion 20M. Further, the front portion of the curtain airbag 20 is structured to include a triangular cloth tether 30 that serves as a tension structure and connects the front pillar 26 and the front end portion of the main deploying portion 20M. Concrete description is given hereinafter.

[Structure of Auxiliary Deploying Portion]

A deployed state, in a non-restrained state with respect to the vehicle body and a non-expanded state, of the front portion of the curtain airbag 20 is shown in a side view in FIG. 3. As shown in this drawing, the auxiliary deploying portion 20S is made to be a bag (a chamber) that is independent from the main deploying portion 20M. The lower rear end portion of the auxiliary deploying portion 20S is a gas passage 20F that is a communicating portion with the lower front end portion of the main deploying portion 20M.

The auxiliary deploying portion 20S receives a supply of gas from the main deploying portion 20M through the gas passage 20F, and is expanded and deployed in a tube shape (a substantially cylindrical shape) that is long vertically. The auxiliary deploying portion 20S is structured so as to not contact the rear surface of an instrument panel 32 in this deployed state (a state of not restraining the occupant P).

Further, in this embodiment, the auxiliary deploying portion 20S is structured so as to be expanded and deployed such that the lower end thereof projects-out further downward than a door belt line BL (refer to FIG. 2). Namely, in this embodiment, the gas passage 20F is structured so as to be expanded and deployed further downward than the door belt line BL. Due thereto, at the time of a roll-over of the automobile A, the occupant being thrown-out of the vehicle is prevented or effectively suppressed. Note that the lower portion of the auxiliary deploying portion 20S (the portion that is deployed further downward than the door belt line BL) may be interpreted as a part of the gas passage 20F.

Note that a seam S, that is long vertically and that partitions the main deploying portion 20M and the auxiliary deploying portion 20S, is formed above the gas passage 20F at the curtain airbag 20. The seam S reaches the upper end of the curtain airbag 20. Note that, instead of the seam S, there may be a structure in which a slit that runs along the up-down direction is formed.

[Structure of Triangular Cloth Tether]

The triangular cloth tether 30 is structured from a cloth (fabric) that, as seen in side view, is deployed in a right triangular shape in which a lower edge 30L and a rear edge 30R form a substantially right angle. The triangular cloth tether 30 is connected due to a portion in the vicinity of the rear edge 30R thereof being sewn or the like to the seam S, that forms the front end of the main deploying portion 20M, along substantially the entire length of the seam S. In this embodiment, in this state, the rear portion of an upper edge 30U, that forms the hypotenuse portion of the triangular cloth tether 30, projects-out further upward than the upper end of the auxiliary deploying portion 20S.

A vehicle body connection portion 30CR, that is connected to the upper end of the front pillar 26 (in a vicinity of the border with the roof side portion 28), is formed at the rear end of the upper edge 30U (the corner portion of the upper edge 30U and the rear edge 30R) of the triangular cloth tether 30. Note that the vehicle body connection portion 30CR may be provided above and in line with the seam S at the curtain airbag 20, as clearly illustrated in FIGS. 2-4A. Namely, the triangular cloth tether 30 may be structured so as to be connected to the upper end of the front pillar 26 via the curtain airbag 20.

On the other hand, a vehicle body connection portion 30CF, that is connected to the lower end of the front pillar 26 (at the upper side of the door belt line BL) is formed at a front end 30F (the corner portion between the upper edge 30U and a lower edge 30L) of the triangular cloth tether 30. Due thereto, the triangular cloth tether 30 connects the upper and lower (front and rear) end portions of the front pillar 26 along the upper edge 30U. This triangular cloth tether 30 is folded-up together with the curtain airbag 20, and is accommodated mainly between the front pillar 26 and the pillar garnish.

Further, accompanying the expansion and deployment of the curtain airbag 20, the triangular cloth tether 30 is deployed at the vehicle width direction outer side of the auxiliary deploying portion 20S, while receiving tension from the curtain airbag 20. Due thereto, the auxiliary deploying portion 20S is structured so as to be supported from the vehicle width direction outer side by the triangular cloth tether 30 at the time when the curtain airbag 20 deploys. Due to this structure, the auxiliary deploying portion 20S deploys while being bent with the rear end side thereof being the base point as seen in plan view, while the front end side thereof heads toward the vehicle width direction inner side.

Note that, at the curtain airbag 20, the straight line, that connects the vehicle body connection portion 30CF at the front side of the triangular cloth tether 30 and the connection point that is connected to the rear pillar at an unillustrated rear end side, forms a tension line in the deployed state (at the time of restraining the occupant). Accordingly, the triangular cloth tether 30 in this embodiment is structured to carry out the function of connecting the main deploying portion 20M of the curtain airbag 20 to the front end of the front pillar 26, and the function of bending the auxiliary deploying portion 20S inwardly in the vehicle width direction as seen in plan view as described above.

[Summary of Structure of Curtain Airbag]

In the above-described curtain airbag device 14, the auxiliary deploying portion 20S is expanded and deployed so as to cover the front pillar 26 and the vehicle width direction outer end portion of an instrument panel 32 as seen from the driver's seat occupant P. Further, as shown in FIG. 1 and FIG. 2, the auxiliary deploying portion 20S is expanded and deployed at the front side with respect to the airbag 18 for a frontal impact (the steering wheel 16), as seen in plan view and side view.

[Structure of ECU]

Further, the occupant protecting device 10 has an occupant protecting ECU 34 that serves as a control device. The occupant protecting ECU 34 is electrically connected to plural impact sensors that are not illustrated. On the basis of information from the respective impact sensors, this occupant protecting ECU 34 can sense (the occurrence of or that there inevitably will be) a frontal impact, a side impact, a rollover, a small overlap impact or an oblique impact with respect to the automobile A to which the occupant protecting ECU 34 is applied.

Here, a small overlap impact is an impact in which the amount of overlap in the vehicle width direction with the collided-with object, as prescribed by IIHS for example, is less than or equal to 25% of the overall width of the automobile A. For example, an impact with the vehicle width direction outer side of a front side member that is a part of the vehicle body skeleton, corresponds to a small overlap impact. In this embodiment, as an example, a small overlap impact at a relative speed of 64 km/hr is supposed. Further, an oblique impact is an impact from the oblique front of the vehicle as prescribed by NHSTA for example (as an example, an impact in which the relative angle with the collided-with object is 15° and the overlap amount in the vehicle width direction is around 35%). In this embodiment, as an example, an oblique impact of a relative speed of 90 km/hr is supposed.

In a case in which the occupant protecting ECU 34 senses a frontal impact, the occupant protecting ECU 34 causes the inflator of the driver's seat airbag device 12 to operate. Further, in a case in which the occupant protecting ECU 34 senses a side impact or a roll-over, the occupant protecting ECU 34 causes the inflator 22 of the curtain airbag device 14 to operate. Moreover, in a case in which the occupant protecting ECU 34 senses a small overlap impact or an oblique impact, the occupant protecting ECU 34 causes the inflator of the driver's seat airbag device 12 and the inflator 22 of the curtain airbag device 14, respectively, to operate.

(Operation)

Operation of the present embodiment is described next.

First, operation of the occupant protecting device 10 in a case in which the occupant protecting ECU 34 senses a small overlap impact is described.

When, on the basis of signals from the respective impact sensors, the occupant protecting ECU 34 senses that a small overlap impact has occurred, the occupant protecting ECU 34 causes the inflator of the driver's seat airbag device 12 and the inflator 22 of the curtain airbag device 14 to operate. Thus, the airbag 18 for a frontal impact receives a supply of gas from the inflator, and is expanded and deployed at the front of the driver's seat occupant P and at the upper rear side of the steering wheel 16.

Further, the curtain airbag 20 receives a supply of gas from the inflator 22, and the main deploying portion 20M is deployed in the shape of a curtain along the side window glasses 24. Moreover, the auxiliary deploying portion 20S, that receive a supply of the gas from the inflator 22 through this main deploying portion 20M and the gas passage 20F, is expanded and deployed.

At the time of a small overlap impact, the driver's seat occupant P moves forward with respect to the vehicle body, and moreover, also moves outwardly in the vehicle width direction (refer to arrow L1 shown by the imaginary line in FIG. 1). Therefore, there are cases in which the head H of the driver's seat occupant P enters-in between the airbag 18 for a frontal impact and the main deploying portion 20M of the curtain airbag 20.

Here, in the present occupant protecting device 10, the triangular cloth tether 30 is deployed at the vehicle width direction outer side of the auxiliary deploying portion 20S. Therefore, the auxiliary deploying portion 20S is bent inwardly in the vehicle width direction, and is deployed protruded-out toward the vehicle width direction inner side. Further, because the rear end of the triangular cloth tether 30 is connected to the upper end (the rear end) of the front pillar 26 at the vehicle body connection portion 30CR, the auxiliary deploying portion 20S is deployed protruded-out greatly toward the vehicle width direction inner side.

This point will be described further by comparison with a comparative example. For example, in a comparative example in which the auxiliary deploying portion 20S is moved toward the vehicle width direction inner side merely by using a tether T (refer to the one-dot chain line in FIG. 1) that connects the front end of the main deploying portion 20M and the lower end of the front pillar 26, the amount of movement of the auxiliary deploying portion 20M toward the vehicle width direction inner side is small. In contrast, in the present embodiment, the (upper portion of the) triangular cloth tether 30 is deployed along the front pillar 26 that extends obliquely in plan view such that the rear side is positioned further toward the vehicle width direction inner side than the front side as shown in FIG. 1. Therefore, the triangular cloth tether 30 is deployed such that the rear end side thereof is positioned further toward the vehicle width direction inner side than the tether T relating to the above-described comparative example. Accordingly, the auxiliary deploying portion 20S in the present embodiment is deployed protruded-out more toward the vehicle width direction inner side than the auxiliary deploying portion 20S in the comparative example.

Due thereto, even if the head H of the driver's seat occupant P were to slip through between the airbag 18 for a frontal impact and the main deploying portion 20M, the head H contacting the front pillar 26 or the instrument panel 32 or the like would be prevented or effectively suppressed by the auxiliary deploying portion 20S. At this time, at the auxiliary deploying portion 20S, the reaction force is supported at the gas passage 20F that is positioned further downward than the door belt line BL. Therefore, the occupant restraining ability is good as compared with a structure that does not have a portion that is positioned further downward than the door belt line BL. Further, due to the vehicle width direction outer end portion of the airbag 18 for a frontal impact, that limits forward movement of the head H, interfering with the auxiliary deploying portion 20S, the effect of effectively suppressing the head H slipping through between the airbag 18 for a frontal impact and the main deploying portion 20M also can be anticipated.

Operation of the occupant protecting device 10 in a case in which the occupant protecting ECU 34 senses an oblique impact is described next.

When, on the basis of signals from the respective impact sensors, the occupant protecting ECU 34 senses that an oblique impact has occurred, the occupant protecting ECU 34 causes the inflator of the driver's seat airbag device 12 and the inflator 22 of the curtain airbag device 14 to operate. In an oblique impact, the driver's seat occupant P moves rectilinearly forward and toward the vehicle width direction outer side (refer to arrow L2 shown by the imaginary line in FIG. 1). Even in this case, the auxiliary deploying portion 20S is moved greatly toward the inner side in the vehicle width direction as described above, and therefore, the head H contacting the front pillar 26 or the instrument panel 36 or the like is prevented or effectively suppressed by the auxiliary deploying portion 20S. At this time, at the auxiliary deploying portion 20S, the reaction force is supported at the gas passage 20F that is positioned further downward than the door belt line BL. Therefore, the occupant restraining ability is good as compared with a structure that does not have a portion that is positioned further downward than the door belt line BL. Moreover, due to the vehicle width direction outer end portion of the airbag 18 for a frontal impact, that limits forward movement of the head H, interfering with the auxiliary deploying portion 20S, the effect of effectively suppressing the head H slipping through between the airbag 18 for a frontal impact and the main deploying portion 20M also can be anticipated.

Moreover, at the curtain airbag device 14, the triangular cloth tether 30, that causes the auxiliary deploying portion 20S to protrude-out greatly toward the vehicle width direction inner side, also functions as a tether that connects the main deploying portion 20M of the curtain airbag 20 to the front end of the front pillar 26. Therefore, the auxiliary deploying portion 20S can be deployed protruded-out greatly toward the vehicle width direction inner side by a simple structure, as compared with a structure in which these functions are performed separately by individual structures.

(Second Embodiment)

Figure 4A:
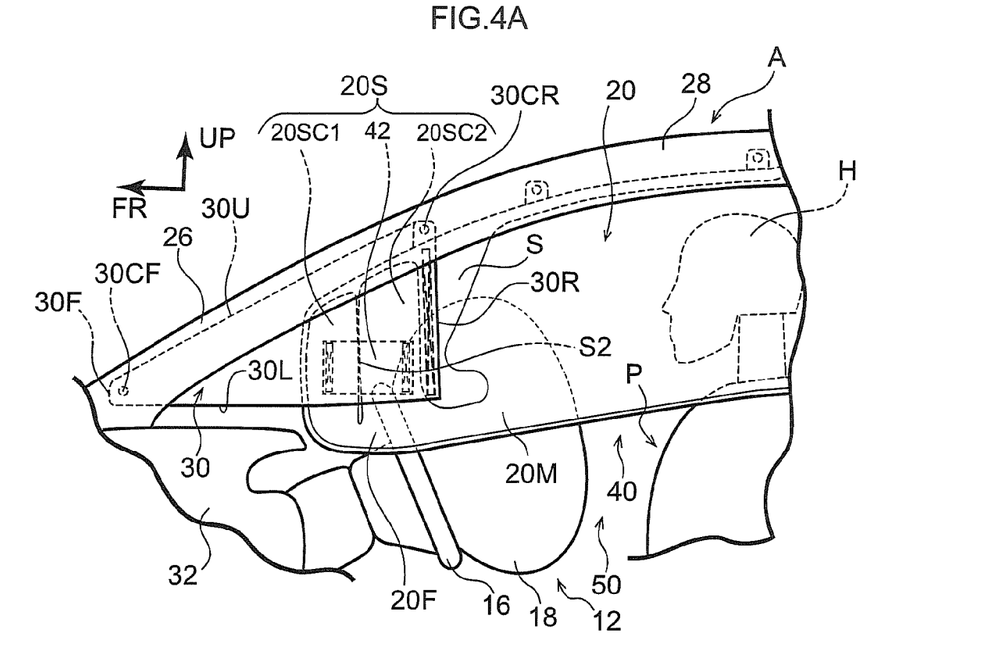
FIG. 4A is a side view that is seen from the vehicle outer side, and shows a curtain airbag that structures an occupant protecting device relating to a second embodiment of the present invention, and schematically shows an operated state of the occupant protecting device.
Figure 4B:
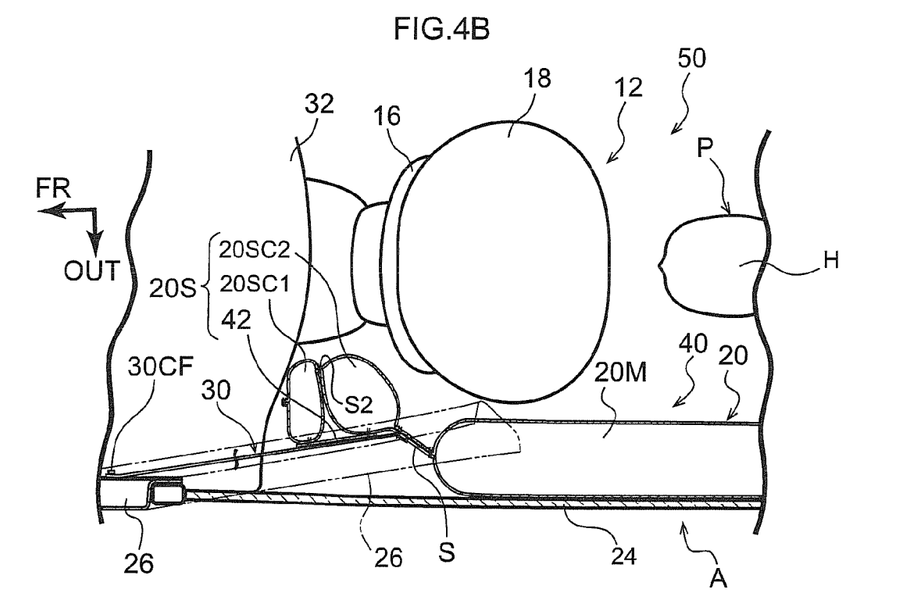
FIG. 4B is a plan view that shows the curtain airbag that structures the occupant protecting device relating to the second embodiment of the present invention, and schematically shows the operated state of the occupant protecting device.

An occupant protecting device 50 relating to a second embodiment is described next with reference to FIG. 4A and FIG. 4B. As shown in these drawings, the occupant protecting device 50 is structured to include the driver's seat airbag device 12 and a curtain airbag device 40. Further, the curtain airbag 20 that structures the curtain airbag device 40 differs from the first embodiment with regard to the point that the auxiliary deploying portion 20S is structured to have plural chambers 20SC1, 20SC2.

The chambers 20SC1, 20SC2 that structure the auxiliary deploying portion 20S are structured as independent bags that are adjacent front and rear and that are partitioned by a seam S2 that extends vertically. Gas is supplied from the main deploying portion 20M through the gas passage 20F to the chambers 20SC1, 20SC2 respectively.

Further, the auxiliary deploying portion 20S has a connecting tether 42 that serves as a connecting body and connects the front and rear chambers 20SC1, 20SC2. As shown in FIG. 4B, the connecting tether 42 is structured so as to connect the portions, that face toward the vehicle width direction outer side in the deployed state, of the chambers 20SC1, 20SC2, and make the surface, that faces outwardly in the vehicle width direction, of the auxiliary deploying portion 20S be a substantially flat surface. In this embodiment, the length of the connecting tether 42 is determined such that the auxiliary deploying portion 20S is deployed in a state in which the chamber 20SC1 is overlapped at the front side of the chamber 20SC2 with the seam S2 being the folding-over portion. The other structures of the curtain airbag device 40 and the occupant protecting device 50, including portions that are not illustrated, are structured similarly to the corresponding structures of the curtain airbag device 14 and the occupant protecting device 10 relating to the first embodiment.

Accordingly, also in accordance with the curtain airbag device 40 that structures the occupant protecting device 50 relating to the second embodiment, similar effects can be obtained by operations that are basically similar to those of the curtain airbag device 14 and the occupant protecting device 10 relating to the first embodiment.

Further, at the curtain airbag device 40, the auxiliary deploying portion 20S is structured by the two chambers 20SC1, 20SC2, that are adjacent front and rear, being connected by the connecting tether 42. When the head H of the occupant P contacts this auxiliary deploying portion 20S, the connecting tether 42 that is flat is overlapped with the triangular cloth tether 30, and the load (reaction force) is supported. Therefore, the auxiliary deploying portion 20S of the present embodiment escaping from the head H due to movement or a change in posture (rolling or the like) is suppressed, as compared with the auxiliary deploying portion 20S that is formed from a single chamber that deploys in a cylindrical shape that extends vertically. Due thereto, even when compared with the first embodiment, the occupant P can be protected more effectively by the auxiliary deploying portion 20S.

Note that the second embodiment illustrates an example in which the auxiliary deploying portion 20S is structured to have the two chambers 20SC1, 20SC2, but the present invention is not limited to this. For example, the auxiliary deploying portion 20S may be structured by at least portions of three or more chambers being connected by the connecting tether 42 or the like. Further, the present invention is not limited to the structure in which the connecting body that connects the plural chambers is the cloth-shaped connecting tether 42. For example, there may be a structure in which plural chambers are connected by a connecting body that is string-shaped or strap-shaped or the like for example.

Further, although the above-described respective embodiments illustrate examples in which the triangular cloth tether 30 receives tension due to the deploying of the main deploying portion 20M, the present invention is not limited to this. For example, there may be a structure in which the triangular cloth tether 30 receives tension accompanying the supporting of the auxiliary deploying portion 20S from the vehicle width direction outer side.

Moreover, the above-described respective embodiments illustrate examples in which the triangular cloth tether 30 performs both the function of connecting the main deploying portion 20M and the front pillar 26, and the function of causing the auxiliary deploying portion 20S to protrude-out greatly toward the inner side in the vehicle width direction. However, the present invention is not limited to this. For example, there may be a structure in which, in addition to the tether that connects the main deploying portion 20M and the front pillar 26, there are provided a single or plural tension structures that, as seen in plan view, are deployed along the front pillar 26 and cause the auxiliary deploying portion 20S to protrude-out greatly toward the inner side in the vehicle width direction. In this case, the tension structure is not limited to a cloth-shaped (fabric-shaped) structure, and may be, for example, string-shaped or strap-shaped or the like.

Further, the above-described embodiment illustrates an example in which the curtain airbag device 14, together with the driver seat airbag device 12, structures the occupant protecting device 10, but the present invention is not limited to this. For example, the occupant protecting device may be structured by the curtain airbag device 14 and a safety device of a different form than the driver's seat airbag device 12. Or, for example, the occupant protecting device may be a structure that protects the occupant from a small overlap impact or an oblique impact by the curtain airbag device 14 alone. Moreover, for example, a pair of auxiliary deploying portions, that are expanded and deployed overlappingly in the vehicle width direction, may be provided at the front end of a main deploying portion for a rear seat, and the head of a rear seat occupant contacting the center pillar may be prevented or effectively suppressed.

Further, although the above-described respective embodiments illustrate examples in which the auxiliary deploying portion 20S is expanded and deployed by the supply of gas from the main deploying portion 20M, the present invention is not limited to this. For example, there may be a structure in which gas is supplied to the auxiliary deploying portion 20S via a gas flow passage that is formed along the upper edge of the curtain airbag, or an inner tube that is provided within the curtain airbag, or the like. Further, for example, there may be a structure in which gas is supplied to the auxiliary deploying portion 20S from an inflator that is separate from the inflator 22 that supplies gas to the main deploying portion 20M. In this structure, it is also possible to expand and deploy the auxiliary deploying portion 20S only in cases of a small overlap impact or an oblique impact.

Moreover, although the above-described embodiment illustrates an example in which the driver's seat airbag device 12 and the curtain airbag device 14 are operated in cases of small overlap impacts and oblique impacts, the present invention is not limited to this. For example, there may be a structure in which the driver's seat airbag device 12 and the curtain airbag device 14 are operated in the case of either one of a small overlap impact and an oblique impact. In this structure, the occupant is protected by another safety device in a case in which the other of a small overlap impact and an oblique impact occurs.

In addition, the present invention can, of course, be embodied by being converted in various ways within a scope that does not deviate from the gist thereof.

(Appendix)

A curtain airbag device relating to a first aspect comprises: a main deploying portion that, at a time when a side impact arises, and at a time when at least one of a small overlap impact or an oblique impact arises, receives a supply of gas and expands, and is deployed in a shape of a curtain along a side window glass; an auxiliary deploying portion that is provided at a front side, in a vehicle front-rear direction, with respect to the main deploying portion, and that, at a time of at least one of a small overlap impact or an oblique impact, receives a supply of gas and is expanded and deployed; and a tension structure that connects a front end side portion in the vehicle front-rear direction of a front pillar and a rear end side portion in the vehicle front-rear direction of the front pillar, and that is deployed while receiving tension such that an intermediate portion in the vehicle front-rear direction passes by a vehicle width direction outer side of the auxiliary deploying portion.

In accordance with the above-described aspect, the occupant is protected from a side impact mainly by the main deploying portion. On the other hand, at the time of a small overlap impact or an oblique impact, there are cases in which the occupant moves also toward the vehicle width direction outer side while moving toward the vehicle front. Here, the auxiliary deploying portion is expanded and deployed at the front of the main deploying portion. Further, at the vehicle width direction outer side of the auxiliary deploying portion, the tension structure is deployed by tension while having inclined so as to run along the front pillar as seen in plan view. Due to this tension structure, the auxiliary deploying portion is deployed protruded-out greatly toward the vehicle width direction inner side. Namely, in the present curtain airbag device, the auxiliary deploying portion can be deployed protruded-out greatly toward the vehicle width direction inner side, as compared with a structure in which the auxiliary deploying portion is moved toward the vehicle width direction inner side by a tether or the like that connects the front end of the main deploying portion and the front end of the front pillar. Owing to this auxiliary deploying portion, the occupant, who moves toward the vehicle front and toward the vehicle width direction outer side, can be protected directly or indirectly.

In this way, in the curtain airbag device of the above-described aspect, the occupant protecting ability by the auxiliary deploying portion, that is expanded and deployed at the front of the main inflating portion, can be improved. Note that the auxiliary deploying portion may be a portion that receives a supply of gas from the main deploying portion, or may be a portion that receives a supply of gas from a gas flow passage that is separate from the main deploying portion or from a gas supplying device. Further, the tension structure may be a structure that receives tension accompanying the deploying of the main deploying portion or the like, or may be a structure that receives tension accompanying the supporting of the auxiliary deploying portion from the vehicle width direction outer side.

In the above aspect, a configuration may be provided, wherein the tension structure is connected respectively to the front end side portion in the vehicle front-rear direction of the front pillar, and the rear end side portion in the vehicle front-rear direction of the front pillar, and a front end side portion in the vehicle front-rear direction of the main deploying portion, and is structured to include a portion that is deployed in a triangular shape as seen in side view.

In accordance with the above-described aspect, the tension structure, that is deployed in a triangular shape as seen in side view, also serves as a tether that connects the main deploying portion and the front pillar. Therefore, the auxiliary deploying portion can be deployed protruded-out greatly toward the vehicle width direction inner side by a simple structure.

In the above aspect, a configuration may be provided, wherein the auxiliary deploying portion is structured by plural chambers, that are deployed so as to be adjacent in the vehicle front-rear direction, being connected to one another by a connecting body at a vehicle width direction outer side.

In accordance with the above-described aspect, in the state in which the occupant is protected by the auxiliary deploying portion, the connecting body, that connects the plural chambers that structure the auxiliary deploying portion, forms a substantially flat surface and overlaps with the tension structure. Therefore, movement or a change in posture of the auxiliary deploying body that is in the occupant protecting state is suppressed, and the occupant can be protected effectively by the auxiliary deploying portion.

In the above aspect, a configuration may be provided, wherein the curtain airbag device further comprises a gas passage that is deployed further downward than a door belt line in a vehicle up-down direction, and through which gas, that is supplied from the main deploying portion to the auxiliary deploying portion, passes.

In accordance with the above-described aspect, gas is supplied to the auxiliary deploying portion from the main deploying portion through the gas passage, and the auxiliary deploying portion is expanded and deployed. Because this gas passage is expanded and deployed further downward than the door belt line, the occupant contacting the door trim can be prevented or effectively suppressed by the auxiliary deploying portion and the gas passage.

An occupant protecting device relating to a second aspect comprises: an airbag device for a front seat that, at a time when a frontal impact arises, and at a time when, among a small overlap impact and an oblique impact, an impact of a form in which the main deploying portion is deployed arises, causes an airbag for a frontal impact to expand and deploy by a supply of gas; and the curtain airbag device of any one of the above-described aspects, which is structured such that the auxiliary deploying portion is expanded and deployed at a front side, in the vehicle front-rear direction, with respect to the airbag for a frontal impact as seen in side view.

In accordance with the above-described aspect, an occupant who moves also toward the vehicle width direction outer side while moving toward the vehicle front at the time of a small overlap impact or an oblique impact, is protected by at least one of the airbag for a frontal impact or the main deploying portion of the curtain airbag device. Here, the auxiliary deploying portion of the curtain airbag device is deployed at the front of the airbag for a frontal impact. Therefore, even if the occupant slips in between the airbag for a frontal impact and the main deploying portion, the occupant contacting a structure of the vehicle body (the instrument panel or a pillar or the like) is prevented or effectively suppressed by the auxiliary deploying portion.

As described above, the curtain airbag device and occupant protecting device relating to the present invention have the excellent effect of being able to improve the occupant protecting ability by an auxiliary deploying portion that is expanded and deployed in front of a main inflating portion.

What is claimed is:

1. A curtain airbag device comprising:
a main deploying portion that, at a time when a side impact arises, and at a time when at least one of a small overlap impact or an oblique impact arises, receives a supply of gas and expands, and the main deploying portion is deployed in a shape of a curtain along a side window glass;
an auxiliary deploying portion that is provided at a front side, in a vehicle front-rear direction, with respect to the main deploying portion, the auxiliary deploying portion is at least partially partitioned from the main deploying portion by an elongated seam that extends generally vertically, and the auxiliary deploying portion, at a time of at least one of a small overlap impact or an oblique impact, receives a supply of gas and is expanded and deployed; and
a tension structure that connects a front end side portion, in the vehicle front-rear direction, of a front pillar and a rear end side portion, in the vehicle front-rear direction, of the front pillar above and in line with the elongated seam, and the tension structure is deployed while receiving tension such that an intermediate portion of the tension structure in the vehicle front-rear direction passes by a vehicle width direction outer side of the auxiliary deploying portion.

2. The curtain airbag device of claim 1, wherein the tension structure is connected respectively to the front end side portion in the vehicle front-rear direction of the front pillar, and the rear end side portion in the vehicle front-rear direction of the front pillar, and a front end side portion in the vehicle front-rear direction of the main deploying portion, and is structured to include a portion that is deployed in a triangular shape as seen in side view.

3. The curtain airbag device of claim 2, wherein the auxiliary deploying portion is structured by a plurality of chambers, that are deployed so as to be adjacent in the vehicle front-rear direction, being connected to one another by a connecting body at a vehicle width direction outer side.

4. The curtain airbag device of claim 3, further comprising a gas passage that is deployed further downward than a door belt line in a vehicle up-down direction, and through which gas, that is supplied from the main deploying portion to the auxiliary deploying portion, passes.

5. An occupant protecting device comprising:
an airbag device for a front seat that, at a time when a frontal impact arises, and at a time when, among a small overlap impact and an oblique impact, an impact of a form in which the main deploying portion is deployed arises, causes an airbag for a frontal impact to expand and deploy by a supply of gas; and
the curtain airbag device of claim 4, which is structured such that the auxiliary deploying portion is expanded and deployed at a front side, in the vehicle front-rear direction, with respect to the airbag for a frontal impact as seen in side view.

6. An occupant protecting device comprising:
an airbag device for a front seat that, at a time when a frontal impact arises, and at a time when, among a small overlap impact and an oblique impact, an impact of a form in which the main deploying portion is deployed arises, causes an airbag for a frontal impact to expand and deploy by a supply of gas; and
the curtain airbag device of claim 3, which is structured such that the auxiliary deploying portion is expanded and deployed at a front side, in the vehicle front-rear direction, with respect to the airbag for a frontal impact as seen in side view.

7. The curtain airbag device of claim 2, further comprising a gas passage that is deployed further downward than a door belt line in a vehicle up-down direction, and through which gas, that is supplied from the main deploying portion to the auxiliary deploying portion, passes.

8. An occupant protecting device comprising:
an airbag device for a front seat that, at a time when a frontal impact arises, and at a time when, among a small overlap impact and an oblique impact, an impact of a form in which the main deploying portion is deployed arises, causes an airbag for a frontal impact to expand and deploy by a supply of gas; and
the curtain airbag device of claim 7, which is structured such that the auxiliary deploying portion is expanded and deployed at a front side, in the vehicle front-rear direction, with respect to the airbag for a frontal impact as seen in side view.

9. An occupant protecting device comprising:
an airbag device for a front seat that, at a time when a frontal impact arises, and at a time when, among a small overlap impact and an oblique impact, an impact of a form in which the main deploying portion is deployed arises, causes an airbag for a frontal impact to expand and deploy by a supply of gas; and the curtain airbag device of claim 2, which is structured such that the auxiliary deploying portion is expanded and deployed at a front side, in the vehicle front-rear direction, with respect to the airbag for a frontal impact as seen in side view.

10. The curtain airbag device of claim 1, wherein the auxiliary deploying portion is structured by a plurality of chambers, that are deployed so as to be adjacent in the vehicle front-rear direction, being connected to one another by a connecting body at a vehicle width direction outer side.

11. The curtain airbag device of claim 10, further comprising a gas passage that is deployed further downward than a door belt line in a vehicle up-down direction, and through which gas, that is supplied from the main deploying portion to the auxiliary deploying portion, passes.

12. An occupant protecting device comprising:
an airbag device for a front seat that, at a time when a frontal impact arises, and at a time when, among a small overlap impact and an oblique impact, an impact of a form in which the main deploying portion is deployed arises, causes an airbag for a frontal impact to expand and deploy by a supply of gas; and the curtain airbag device of claim 11, which is structured such that the auxiliary deploying portion is expanded and deployed at a front side, in the vehicle front-rear direction, with respect to the airbag for a frontal impact as seen in side view.

13. An occupant protecting device comprising:
an airbag device for a front seat that, at a time when a frontal impact arises, and at a time when, among a small overlap impact and an oblique impact, an impact of a form in which the main deploying portion is deployed arises, causes an airbag for a frontal impact to expand and deploy by a supply of gas; and the curtain airbag device of claim 10, which is structured such that the auxiliary deploying portion is expanded and deployed at a front side, in the vehicle front-rear direction, with respect to the airbag for a frontal impact as seen in side view.

14. The curtain airbag device of claim 1, further comprising a gas passage that is deployed further downward than a door belt line in a vehicle up-down direction, and through which gas, that is supplied from the main deploying portion to the auxiliary deploying portion, passes.

15. An occupant protecting device comprising:
an airbag device for a front seat that, at a time when a frontal impact arises, and at a time when, among a small overlap impact and an oblique impact, an impact of a form in which the main deploying portion is deployed arises, causes an airbag for a frontal impact to expand and deploy by a supply of gas; and the curtain airbag device of claim 14, which is structured such that the auxiliary deploying portion is expanded and deployed at a front side, in the vehicle front-rear direction, with respect to the airbag for a frontal impact as seen in side view.

16. An occupant protecting device comprising:
an airbag device for a front seat that, at a time when a frontal impact arises, and at a time when, among a small overlap impact and an oblique impact, an impact of a form in which the main deploying portion is deployed arises, causes an airbag for a frontal impact to expand and deploy by a supply of gas; and the curtain airbag device of claim 1, which is structured such that the auxiliary deploying portion is expanded and deployed at a front side, in the vehicle front-rear direction, with respect to the airbag for a frontal impact as seen in side view.

\* \* \* \* \*